(12) United States Patent
Little et al.

(10) Patent No.: US 6,639,572 B1
(45) Date of Patent: *Oct. 28, 2003

(54) PAPER WHITE DIRECT VIEW DISPLAY

(75) Inventors: Michael L. Little, Oak Park, CA (US); John J. Lyon, San Marcos, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,285

(22) Filed: Apr. 10, 2000

Related U.S. Application Data

(63) Continuation-in-part of application No. 09/466,886, filed on Dec. 20, 1999, which is a continuation of application No. 09/179,750, filed on Oct. 28, 1998, now Pat. No. 6,034,807

(60) Provisional application No. 60/129,335, filed on Apr. 15, 1999, and provisional application No. 60/129,336, filed on Apr. 15, 1999.

(51) Int. Cl.[7] ............................. G09G 3/20; G09G 3/34
(52) U.S. Cl. ..................... 345/55; 345/102; 345/108; 345/109; 359/227; 359/233; 359/234
(58) Field of Search ..................... 345/55, 108, 109, 345/102; 359/223, 234, 227, 243, 290, 291

(56) References Cited

U.S. PATENT DOCUMENTS

| | | | |
|---|---|---|---|
| 3,553,364 A | 1/1971 | Lee ............................. 178/7.3 |
| 3,648,281 A | 3/1972 | Dahms et al. .............. 340/373 |
| 3,846,605 A | 11/1974 | Pirchi ........................ 345/108 |
| 3,897,997 A | 8/1975 | Kalt ............................ 350/161 |
| 4,160,583 A | 7/1979 | Ueda .......................... 350/269 |
| 4,176,345 A | 11/1979 | Micheron et al. .......... 340/373 |
| 4,383,255 A | 5/1983 | Grandjean et al. ........ 345/109 |
| 4,564,836 A | 1/1986 | Vuilleumier et al. ....... 340/783 |
| 4,786,898 A | 11/1988 | Hata et al. .................. 340/783 |
| 4,794,370 A | 12/1988 | Simpson et al. ............ 340/825 |
| 5,062,689 A | 11/1991 | Koehler ...................... 359/230 |
| 5,083,857 A * | 1/1992 | Hornbeck .................... 359/224 |
| 5,111,193 A | 5/1992 | Huber et al. |
| 5,142,405 A | 8/1992 | Hornbeck .................... 359/226 |
| 5,196,767 A | 3/1993 | Leard et al. ................. 315/349 |
| 5,231,559 A | 7/1993 | Kalt et al. ................... 361/301 |
| 5,280,277 A | 1/1994 | Hornbeck .................... 345/108 |
| 5,285,196 A | 2/1994 | Gale, Jr. ....................... 345/108 |
| 5,382,961 A | 1/1995 | Gale, Jr. ....................... 345/108 |
| 5,389,945 A | 2/1995 | Sheridon ....................... 345/85 |
| 5,444,566 A | 8/1995 | Gale et al. .................... 359/291 |
| 5,504,614 A * | 4/1996 | Webb et al. .................. 348/770 |
| 5,552,925 A | 9/1996 | Worley ......................... 359/230 |
| 5,600,383 A | 2/1997 | Hornbeck .................... 348/771 |
| 5,629,794 A * | 5/1997 | Magel et al. ................. 359/214 |

(List continued on next page.)

FOREIGN PATENT DOCUMENTS

| WO | WO 99/45423 | 9/1999 |
|---|---|---|

*Primary Examiner*—Amare Mengistu
*Assistant Examiner*—Jimmy H. Nguyen
(74) *Attorney, Agent, or Firm*—Blakely, Sokoloff, Taylor & Zafman LLP

(57) ABSTRACT

A low power, paper white, direct-view display includes an array of hinged micromirrors that are deflected between two states, a first state in which the micromirror covers a portion of the background and a second state in which the micromirror uncovers the background. In one particular configuration, a stability mechanism is incorporated in the display so that the micromirrors switch between stable states and remain in those stable states unless and until an actuating force is applied to the micromirrors that is sufficient to overcome an actuation threshold. The mechanics of the hinge, stiction due to Van der Waals forces or a combination of both can be used to provide bistability. Bistability allows power to be removed from the display between updates but requires active actuation between both states. The drive electronics are similar to those used in multiplexed LCDs.

23 Claims, 11 Drawing Sheets

U.S. PATENT DOCUMENTS

| | | | |
|---|---|---|---|
| 5,636,052 A | 6/1997 | Arney et al. | 359/291 |
| 5,638,084 A | 6/1997 | Kalt | 345/31 |
| 5,677,784 A | 10/1997 | Harris | 359/290 |
| 5,754,332 A | 5/1998 | Crowley | 359/296 |
| 5,784,189 A | 7/1998 | Bozler et al. | 359/254 |
| 5,784,190 A | 7/1998 | Worley | 359/291 |
| 5,790,088 A | 8/1998 | Johnson et al. | 345/84 |
| 5,835,256 A | 11/1998 | Huibers | 359/291 |
| 5,923,313 A | 7/1999 | Black et al. | 345/108 |
| 6,005,649 A | 12/1999 | Krusius et al. | |
| 6,329,967 B1 * | 12/2001 | Little et al. | 345/102 |

* cited by examiner

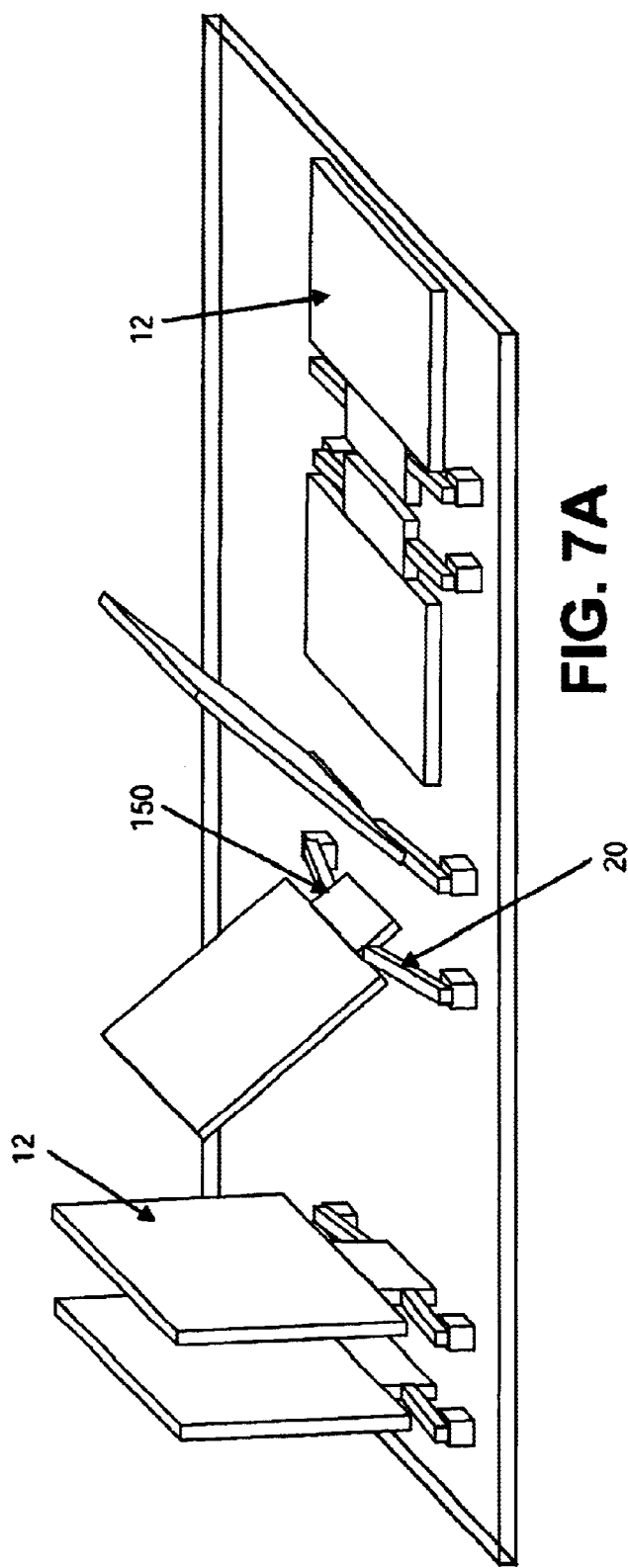
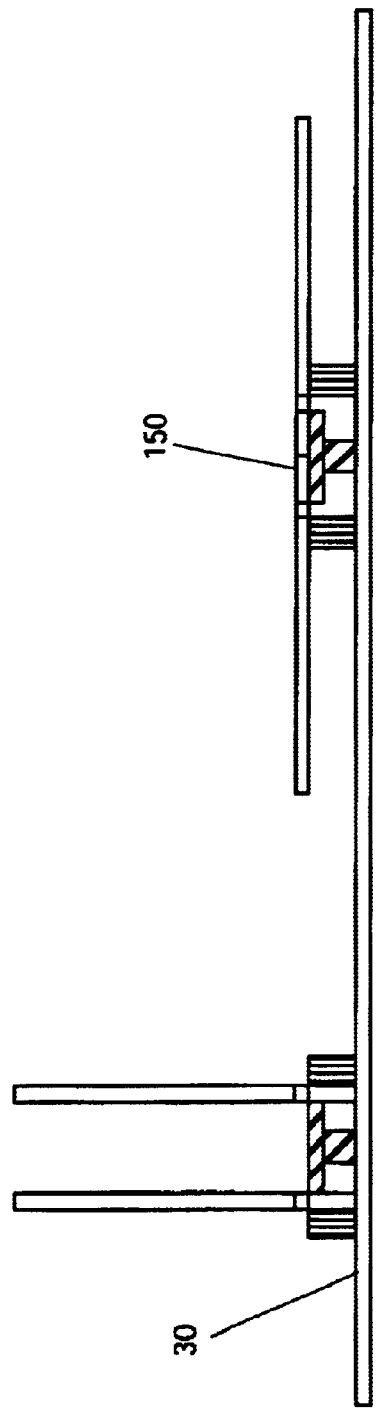

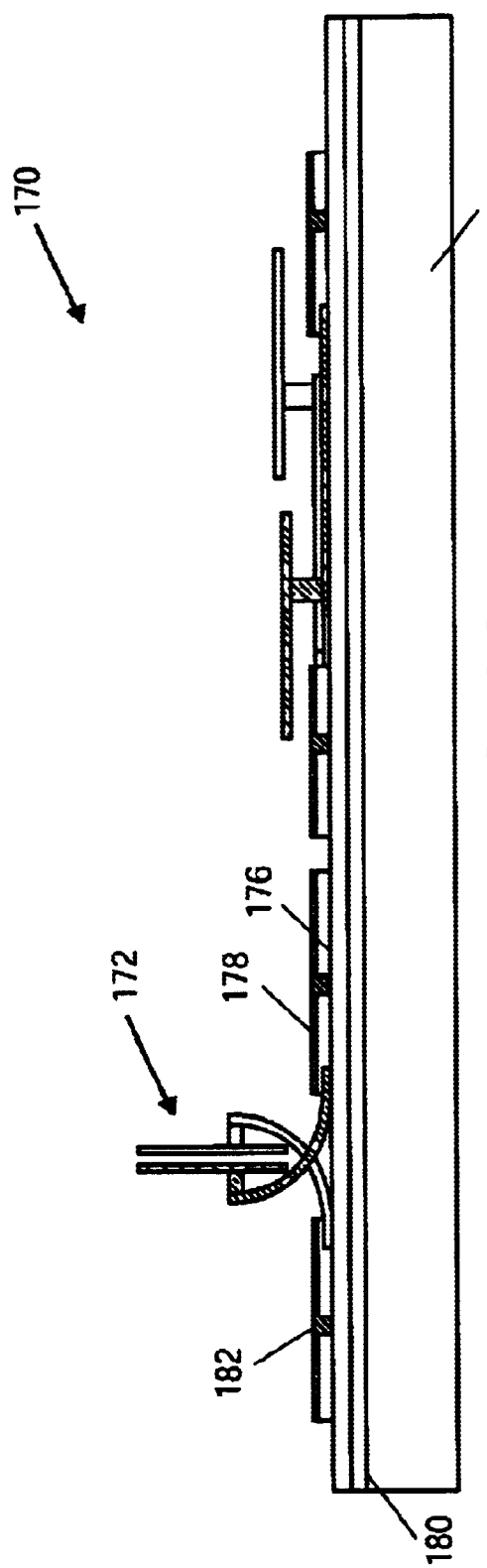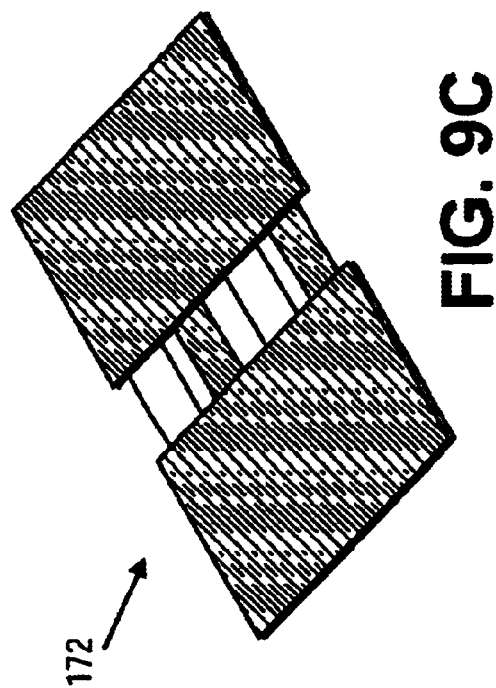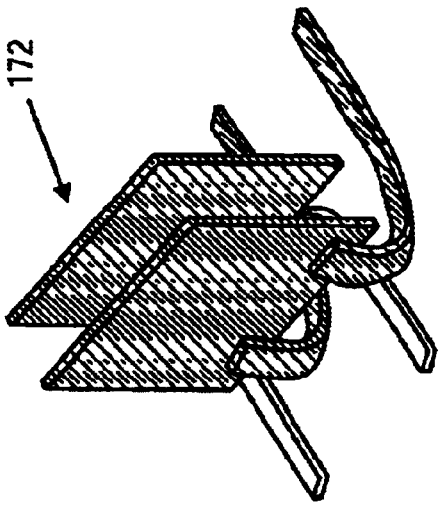

PAPER WHITE DIRECT VIEW DISPLAY

RELATED APPLICATIONS

This application is a continuation-in-part of application Ser. No. 09/466,886 filed Dec. 20, 1999 entitled "Bistable Paper White Direct View Display", which is a continuation of application Ser. No. 09/179,750 filed Oct. 28, 1998 (U.S. Pat. No. 6,034,807), both of which are hereby incorporated by reference in their entirety. Priority is also claimed based on U.S. Provisional Applications Nos. 60/129,335 filed Apr. 15, 1999 and 60/129,336 filed Apr. 15, 1999.

BACKGROUND OF THE INVENTION

1. Field of the Invention

This invention relates to direct view displays and more specifically to a paper white display having an array of hinged micromirrors adapted to switch between two states to alternately cover and uncover a contrasting background.

2. Description of the Related Art

Direct-view displays produce images that can be viewed directly without the aid of magnification or projection. The market for direct view displays spans a continuum of performance and price that includes the ultra high performance but very expensive flat-panel DTVs, moderately performing and priced laptop computers, and the lower performing but much cheaper personal digital assistants, electronic books and cellular telephones. The high-end displays offer high spatial and color resolution but are very expensive and consume a lot of power. The low-end displays offer less resolution but are relatively cheap and can be operated from battery power.

This low-end market is currently dominated by the multiplexed liquid crystal display (LCD) technology. Multiplexed LCDs sacrifice grey scale performance in favor of fabrication simplicity and power consumption by eliminating the thin film transistor (TFT) array used in Active Matrix LCDs (AMLCD), which dominate the laptop computer market. The liquid crystal panel is fabricated with orthogonal row and column addressing lines on opposite sides of the liquid crystals that are driven by row and column drive electronics. The row drivers enable the row addressing lines one row at a time while the column drivers apply selected voltages to all of the column addressing lines to apply a voltage across the cells in the enabled row. The voltage changes the transmissive characteristics of the liquid crystal, which in turn optically modulates the amount of light transmitted through the LCD.

Because liquid crystals respond relatively slowly to changes in the applied voltage, the cell modulation is proportional to the root-mean-square (rms) voltage applied across the cell throughout the frame time. Although the voltage applied during the row enable is very large, the background noise created by the applied voltages for the remaining n−1 rows greatly reduces the RMS value of the margin between the off-state and full on-state of the liquid crystal. For example, commercially available AMLCDs can resolve about 16 million different colors while similarly available multiplexed LCDs can resolve only 256 different colors. As the number of scanned rows increases, this disparity in grey scale color resolution grows.

These LCDs must be constantly refreshed, e.g. 30 times per second, which consumes a lot of power. Without a sustaining voltage they will decay from their modulated state to their relaxed state over time. Furthermore, the polarizers inherently required by LCDs absorb such a large fraction of the ambient light, typically 60%–70%, they are unable to produce the "paper white" quality desired by the industry. As such consumers must make do with cell phones and PDAs whose gray displays are difficult to read even under the best ambient lighting conditions. Power consuming backlights must be added to improve their readability to minimum acceptable levels.

Another class of displays that are prevalent and gaining market share in low-end applications are bistable displays. Bistable displays have two stable states, black and white. True bistable displays do not require a voltage to be applied to remain in either state and thus require no power when stable. Quasi bistable displays require an applied voltage to hold the stable state. Ideally, i.e. no leakage current, this would still require no power. However, in practice there is some amount of power consumed. In either case, since bistable displays do not require continuous refreshing they are very low power. This makes them ideally suited for hand-held applications such as cellular telephones, PDAs and electronic books. Adequate grey scale resolution can be achieved using standard half-toning techniques. However, known bistable displays suffer from the same problem as multiplexed LCDs, their white state tends to be gray rather than paper white. As a result, they require backlighting and their readability is limited even in the best ambient light conditions.

Kent Displays, Inc. is the leader in bistable Cholesteric LCDs. The bistability of cholesteric optical textures allows for high resolution on a low cost passive matrix with reduced power consumption since power is not needed to continuously refresh the image. The reflected colors of the cholesteric liquid crystal materials provide for a display that is readily viewed in sunlight or low ambient light without dedicated illumination. However, single layer cholesteric LCDs are colored and combining different color layers to get a neutral color dark state severely reduces the overall brightness of the display. These displays are very dim; black characters on a dark grey background instead of black on a white background.

Xerox PARC is developing a gyricon technology in which bichromal spheres are cast in a clear elastomer on a flexible substrate. The sphere dipole causes rotation in an electric field to show either the black or white surface of the sphere. The gyricon display is thin, flexible, exhibits a wide viewing angle and, like other bistable devices, requires no power to store the device. However, contrast ratios of only 6:1 have been achieved.

E Ink, Corporation is developing an alternative bistable display technology, electronic ink, in which the ink is made of microcapsules, each of which can change color with an applied electric field. More specifically the microcapsules are filled with a colored dye. Charged white particles are suspended in the dye. Orienting the electric field the right way causes white particles to be attracted to the surface so that the display appears white and vice-versa. E Ink claims to have achieved 75% brightness, 30:1 contrast ratio and a 180 degree viewing angle.

Iridigm Display Corporation uses a MEMS technology in which bridge-like elements move up and down in response to an applied voltage to achieve a bistable display. By changing an element's position from up to down, either constructive or destructive interference is created with an external light source. This allows each element to switch from reflective to absorbing, from green to black, for example. Each image pixel is composed of tens-to-hundred of bridge elements, which facilitates grey scale and reduces yield requirements. Iridigm's displays are fabricated on glass substrates using standard thin film transistor (TFT) materials and processing techniques, that allow them to construct aluminum bridge elements and a proprietary thin-film stack to control interference. However, because Iridigm's display is based on interference patterns it will be sensitive to viewing angle and will have difficulties achieving paper white quality.

A number of quasi-bistable electromechanical shutter technologies have been pursued and patented for direct view displays, but have not yet succeeded to large scale commercialization due to a variety of issues including fabrication, stiction, limited contrast ratio, poor optical efficiency, high cost and poor pixel uniformity U.S. Pat. No. 3,553,364 to Lee entitled "Electromechanical Light Valve" describes an electromechanical light valve in an array of many such valves for controlling the transmission of light in continuously changing patterns. Each light valve consists of a housing having grounded conducting walls for shielding the interior thereof from external electrostatic forces produced by surrounding valves and a leaf shutter mounted in the housing. The application of a voltage to the leaf shutters causes the shutter to be attracted to the grounded conducting walls. As the voltage differential increases, the angle the shutter deflects increases, which in turn allows less light to pass through the housing.

Lee's design always involves the leaf shutters touching one surface or another, e.g. the conductive center plate or the grounded conductive walls, which can and will cause stiction due to the Van der Waals forces. The optical efficiency of this design is very low due to the low open aperture caused by the opaque conductive sidewalls. The portion of each pixel that is transparent and thus able to transmit light is a small fraction of the pixel. In addition, the cost and complexity of fabricating an array of such housings makes high resolution displays impractical.

U.S. Pat. No. 4,564,836 to Vuilleumier et al. entitled "Miniature Shutter Type Display Device with Multiplexing Capability" describes a display device comprising an insulating carrier and shutters that are capable of rotating under the effect of an electric field. The shutters are grouped in pairs and are controlled by applying a voltage between the shutter and a counter-electrode. After actuating the selected shutter, a holding voltage is then applied between the pair of shutters to hold them in place. Vuilleumier's device involves shutters touching each other or a stop, which can cause stiction problems. This design, like that of Lee, also has low optical efficiency due to the opaque sidewalls of the individual cavities.

U.S. Pat. 5,784,189 to Bozler et al. entitled "Spatial Light Modulator" discloses a spatial light modulator formed of a moveable electrode which is disposed opposite a fixed electrode, and is biased to roll in a preferred direction upon application of an electric field across the electrodes to produce a light valve or light shutter. As shown in FIGS. 24–25, Bozler teaches a quasi "bistable" device, one in which the "hold-on" voltage is less than the voltage required to initially turn the shutter on. Bozler's devices do not exhibit true bistability in the sense that if the field is removed entirely the device does not remain in one of two stable positions. Energy is required to resist the spring force. This consumes power equal to the product of the hold-on voltage and the parasitic resistance.

Bozler's quasi "bistability" is created by forming a step S in the moveable electrode, which produces a hysteresis in the voltage required to unroll the coil. A second way to create a quasi bistable device is to use the Van der Walls forces, which occur when two materials come into contact. By selecting materials and controlling the surface condition a magnitude of adhesion force can be achieved which is low enough to allow roll-up of the shutter at zero applied voltage but large enough to significantly reduce the hold voltage below the roll out voltage, assuming there is no step. An alternate bistable device is illustrated in FIG. 27, in which a deformable membrane switch switches between an up position where it looks white or the color of the conductor and a flat position where it looks black or blue. The deformable switch is biased in the up position by anisotropic stress. Once pulled down by the application of an electric field, the switch will stay down due to the Van der Waals forces as long as the applied electric field exceeds a threshold. In all cases, Bozler's designs cannot achieve true bistability since none of his designs teach a method of actively driving the shutter into both the "ON" state and the "OFF" state.

SUMMARY OF THE INVENTION

In view of the above problems, the present invention provides a low power, paper white direct-view display.

The display includes an array of hinged micromirrors that are mounted in front of a background. The micromirrors' top surfaces and the background exhibit different, e.g. contrasting, light reflecting properties. The micromirrors are adapted to rotate around their hinges to switch between two states, a first state, in which the micromirror covers a portion of the contrasting background thereby exposing the micromirror's top surface, and a second state, in which the micromirror uncovers and exposes the portion of the background to form an image.

In one embodiment, the micromirrors are suitably formed on a translucent white substrate positioned in front of a backlight. Under most ambient lighting situations, the display achieves near paper white quality. When ambient light is absent, the backlight provides sufficient illumination to achieve near paper white quality. Each mirror has a highly reflective bottom surface and a highly absorbent top surface. This configuration produces a dark state in which the mirror's outwardly facing absorbent surface covers a portion of the white background to both block transmitted light and absorb ambient light and a white state in which the mirror uncovers the background to reflect ambient light onto the white substrate and let transmitted light pass. To further enhance the white state the mirrors can be paired so that their absorbent surfaces are spaced close together facing each other when fully rotated. Alternately, the display can be implemented without a backlight, in which case the background could be black (opaque white) and the mirrors could reflect (absorb) ambient light when covering the background.

In one particular configuration, a stability mechanism is incorporated in the display so that the micromirrors switch between stable states and remain in those stable states unless and until an actuating force is applied to the micromirrors that is sufficient to overcome an actuation threshold. The mechanics of the hinge, stiction due to Van der Waals forces or a combination of both can be used to provide bistability. Bistability allows power to be removed from the display between updates but requires active actuation between both states. Alternatively a quasi-bistable mechanism may be incorporated whereby the mirrors are held in an actuated state by a combination of stiction and a holding voltage and remain there until the holding voltage is removed. The true and quasi bistable mechanisms differ in that for a true bistable device, power can be removed, but the micromirror must be actuated to both states, whereas power must always be maintained on the quasi-bistable device but actuation is only required to one of the stable states.

The direct-view display may comprise an assembly of a lower substrate, which supports the array of micromirrors and a corresponding array of lower electrodes for actuating the micromirrors, and an upper substrate on which are formed an array of upper electrodes for actuating the substrate. Alternately, the display may be monolithically fabricated on a single substrate with a split lower electrode for actuating the micromirrors between both states. In each configuration, a stall compensation mechanism may be used to actuate the micromirrors the full ninety degrees.

In these various configurations, a controller may apply a first potential to enable selected micromirrors and a second potential to produce an actuating force on the enabled micromirrors that exceeds the actuation threshold thereby actuating the enabled mirrors between their two stable states. The actuating forces on the remaining non-enabled micromirrors are insufficient to overcome the actuation threshold so that the non-enabled mirrors remain in their current stable state. The controller suitably addresses the array using a multiplexing scheme in which the micromirrors are enabled one row at a time.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 7a through 7c are perspective views of a bistable stretch hinge;

FIGS. 9a through 9c are a sectional view of a monolithic quasi-bistable direct-view display using stress curled micromirrors and perspective views of a pair of micromirrors in their rest and actuated states.

DETAILED DESCRIPTION OF THE INVENTION

The present invention provides a paper-white direct-view display in which an array of hinged micromirrors are deflected between two states, a first state in which the mirror covers a portion of a background and a second state in which the mirror uncovers the background. The mirrors' top surfaces are exposed when the mirrors cover the background and have a different e.g. contrasting, light reflecting properties to the background such that the controlled actuation of the micromirrors between covering and uncovering the background produces a visible image. The portion of the background covered by the mirror corresponds to an image pixel or some fraction of an image pixel. Grey scale is achieved using standard half-toning techniques in which each image pixel corresponds to multiple mirrors. The flat-panel display exhibits paper white quality at a fraction of the power required by LCDs, either multiplexed or actively addressed.

The micromirror display provides a particularly good fit with certain user-interactive applications such as personal digital assistants, cellular telephones and electronic books that require a good white state and low power consumption but only limited spatial and grey scale resolution. The micromirror display provides the brightness required to achieve the elusive "paper white" quality that the display industry has been seeking and that consumers have long been demanding. Furthermore, the micromirror display does not require continuous refreshing to hold the current image, and thus only consumes power when the information content changes. In the applications listed above the content of the display changes relatively infrequently, thus the amount of power needed to drive the micromirror display may be an order of magnitude or less of that required to drive an LCD. In addition, because the display is has a bright white background similar to paper, in most instances ambient light is sufficient and a backlight is required much less frequently, only as a night light. Since the display and backlight may consume a substantial portion of the total power used by these devices, this dramatic reduction in power consumption will extend battery life and may eliminate the need for a rechargeable battery altogether and allow such devices to run off photo electric cells.

Figure 1:
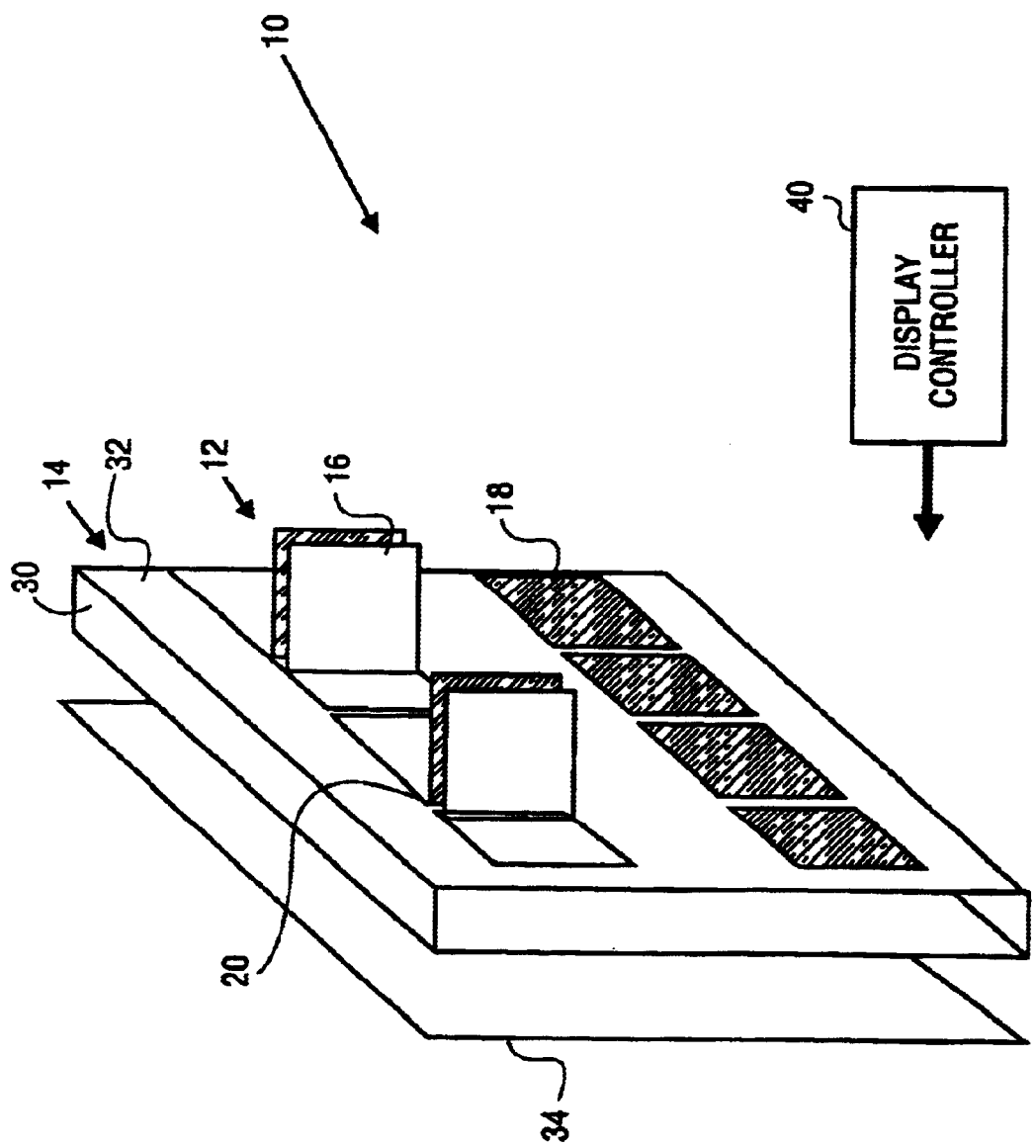
FIG. 1 is a perspective view of a direct-view display in accordance with the present invention.

As illustrated in FIG. 1, a direct-view display 10 includes an array of hinged micromirrors 12 that are fabricated immediately above a background 14. Each micromirror 12 has a bottom surface 16 and a top surface 18, which preferably has different light reflection properties than background 14. Each micromirror 12 rotates around an axis 20, e.g. a hinge, to switch between two stable states, a first state in which the mirror covers the major portion of background 14 thereby exposing the mirror's top surface 18 and a second state in which the mirror is substantially perpendicular to the surface of the background thereby uncovering the background to form an image. To maximize contrast ratio, the mirror preferably deflects close to 90 degrees to uncover the major portion covered by the mirror. However, near paper white quality can be achieved with something less than full 90 degree deflection. Limited grey scale can be achieved using conventional half-toning techniques.

In the specific embodiment illustrated in FIG. 1, the array of micromirrors 12 are supported on a glass substrate 30, which has a translucent white surface 32 that both reflects ambient light and can transmit light from a backlight 34 to provide a white background. The micromirrors top surface is highly absorbent such that in their first or dark state the micromirrors absorb any ambient light and block any transmitted light. In their second or white state, the micromirrors allow ambient light to be reflected off of and transmitted light to pass through the background. The mirrors' bottom surfaces are non-absorbing (either specularly reflective or diffuse)to maximize the amount of light reflected in the white state. As shown, the mirrors are preferably formed in pairs to maximize contrast ratio by mutually hiding the absorbent top surfaces when they are activated. Unlike LCDs and other bistable displays, the backlight is not required under normal ambient lighting conditions. Given the display's paper white quality, the backlight is only needed as a night light.

If the display is designed for ambient light viewing only, i.e. no backlight, the background could be black (vs. opaque white) and the mirrors could reflect (vs. absorb) ambient light when covering the background. Color displays can be realized by coloring the background red, green and blue and using black mirrors or by applying varying thickness dielectric films such as SiO2 or Si3N4 to the mirrors to allow them to reflect specific colors, i.e. the oil film on water effect.

Figure 2:
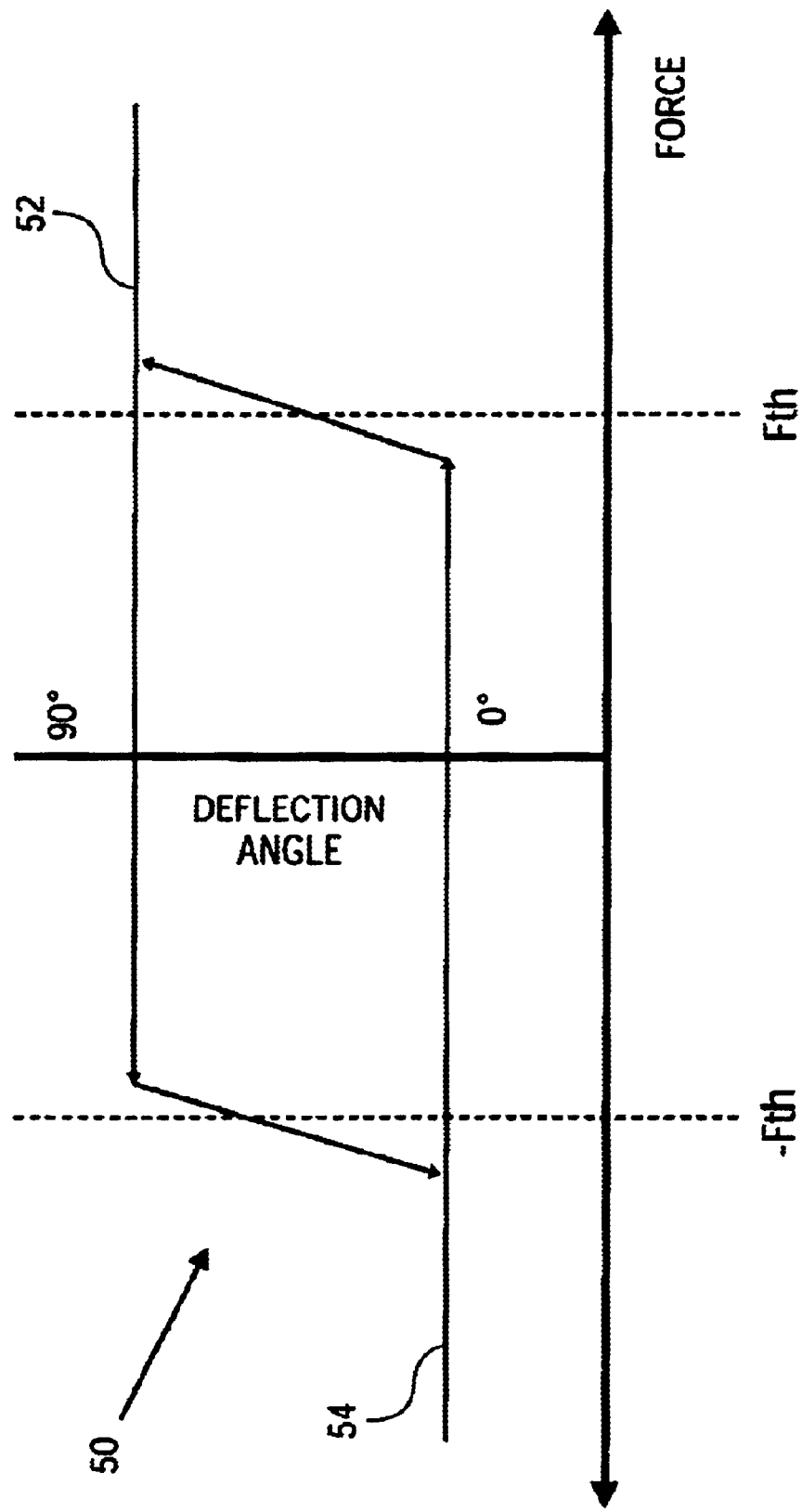
FIG. 2 is a plot of the bistable response exhibited by the micromirror.

A stability mechanism may be included that allows the micromirrors to be written to a desired stable state, e.g. image, and left there until the image is updated. This avoids the constant refreshing associated with LCDs and greatly reduces power consumption. A bistable response 50 is depicted in FIG. 2 in terms of the net force exerted on a mirror. When the net attractive force on the mirror is upwards and exceeds a threshold (Fth), the mirror deflects to its upright position 52 or second state. The mirror remains in its upright position until the net attractive force is downward and exceeds −Fth. This causes the mirror to deflect to its down position 54 or first state where it again remains until the net force in the opposite direction exceeds the threshold. In a truly bistable mechanism, once the mirror is switched to a stable state, the mirror will remain in the stable state if power is removed and will remain in the stable state if and until an actuating force greater than the threshold is applied. In a quasi bistable mechanism, once the mirror is switched to its actuated stable state it remains there under the application of a holding voltage. When the holding voltage is removed or lowered below the actuation threshold, the net force from the suspension on the mirror exceeds the electrostatic force and the mirror switches to its rest stable state where it remains until the net force exceeds the normal actuation threshold. The true bistable mechanism must be driven to both of its stable states whereas the quasi-bistable mechanism is only driven to one of its stable states and returns to the other when the holding voltage is removed. The drawback to the quasi-bistable mechanism is that power must be applied to hold it in its actuated state. The amount of power consumed is determined by leakage currents.

In both the quasi-bistable and bistable displays a display controller 40 implements a passive addressing scheme to actuate the mirrors. Row and column addressing lines respectively connect mirror and control electrodes on one or more substrates. Voltages are applied to one or more sets of row addressing lines on one or more substrates that enable the mirrors one row at a time while disabling the remaining rows. Addressing voltages are applied to the column addressing lines to actuate the mirrors in the enabled rows to their desired states. This approach is effective because the response times of the mirrors are much shorter than the row addressing times. In the quasi bistable case, the mirror must be driven in only one direction so a single set of row addressing lines is adequate. In the bistable case, a second set of row addressing lines are required to actuate the mirror in both directions. Typically, a face glass with a second set of row addressing lines is used.

Bistability may be achieved in many different ways using hinge mechanics, stiction due to Van der Waals forces or some combination of the two forces. One approach to achieving a true bistable response is to mount each micromirror on a hinge that has only two stable states approximately 90° apart. Another approach is to deflect a micromirror between a pair of stops approximately 90° apart and use the Van der Waals forces to produce the bistability. These approaches may be used in combination to improve reliability.

Bistable Torsional Hinge

Figures 3A, 3B:
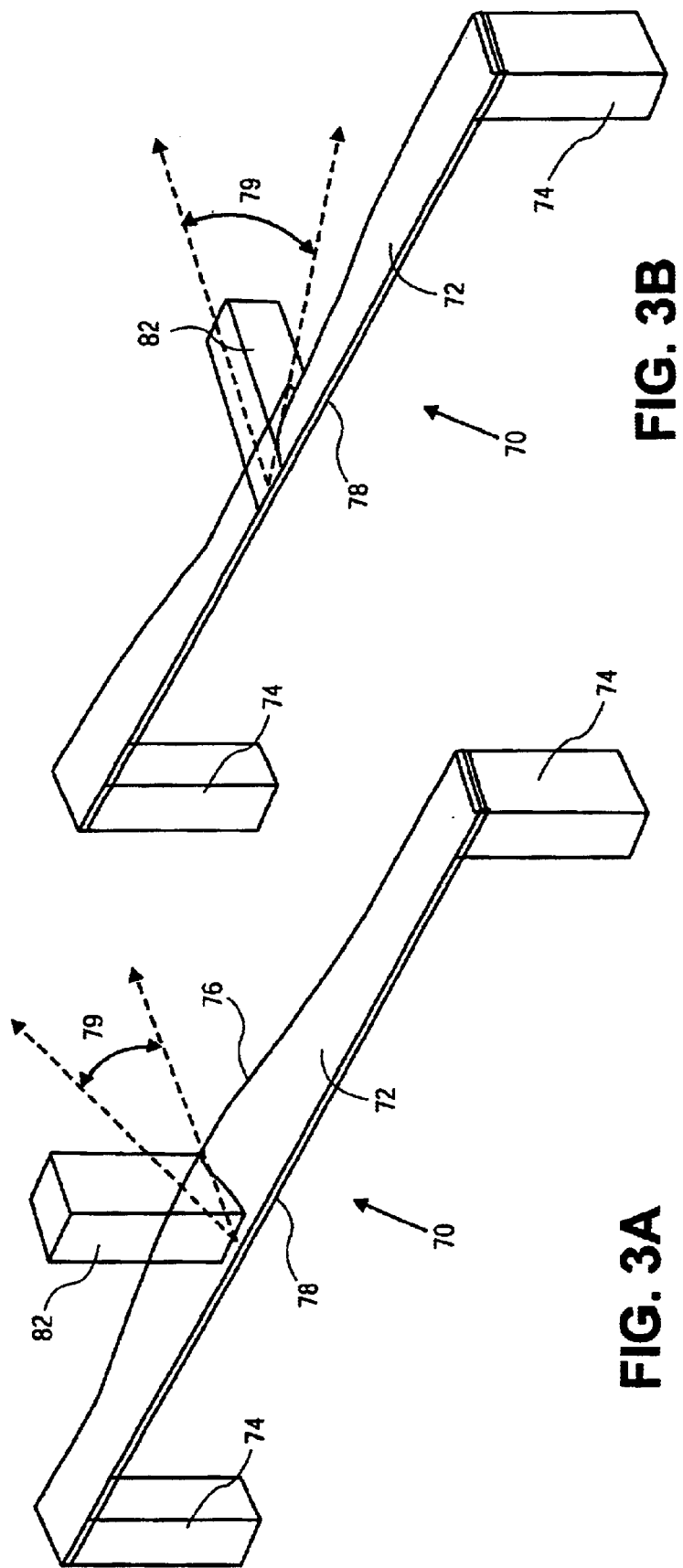
FIGS. 3a and 3b are perspective views of a bistable torsional hinge.

Bistability may be achieved by making one edge of the micromirror hinge longer than the other as shown in FIGS. 3a and 3b. This produces a compressive force when the hinge is flat that tends to drive the hinge to one of two stable states. Micromirror 12 is mounted on a hinge 70 that has only two stable states approximately 90° apart. One such hinge 70 comprises a relatively long narrow compliant strip 72 that is pinned at both ends by posts 74, which are attached to the substrate (not shown). As shown the strip's outside edge 76, i.e. the edge opposite micromirror 12, is longer than the inside edge 78. This can be accomplished in a number of ways including fabricating the strip over a polyimide bump so that the outside edge is naturally longer. Alternately, an even narrower strip of material under compressive stress can be defined along the outside edge of the otherwise flat strip. The strip's compressive stress causes the outside edge to stretch to the desired length. Similarly, the compliant strip can be formed with compressive stress and an even narrower strip of material under tensile stress can be defined along the inner edge to shorten it.

As a result, strip 72 has a maximum compressive stress when it is flat and naturally "pops" or "snaps" to a stable cupped position either above or below the flat position. The amount of cupping, i.e. the deflection angle 79 formed between the flat and cupped positions at the midpoint of strip 72, is proportional to the difference in length between in the inside and outside edges. This difference is set so that the deflection angle 79 at the midpoint of strip 72 in either direction is approximately 45°.

Micromirror 12, which is covered with an anti-reflective coating, is mounted on a post 82 at the midpoint of strip 72. The bottom of post 82 is tapered by a complementary 45° such that the mirror lies approximately flat in one position and approximately upright in the other. Alternately, the lengths of the inside and outside edges and the direction of post 82 can be reversed with the same result.

Bistable S-Hinge

Figure 4A:
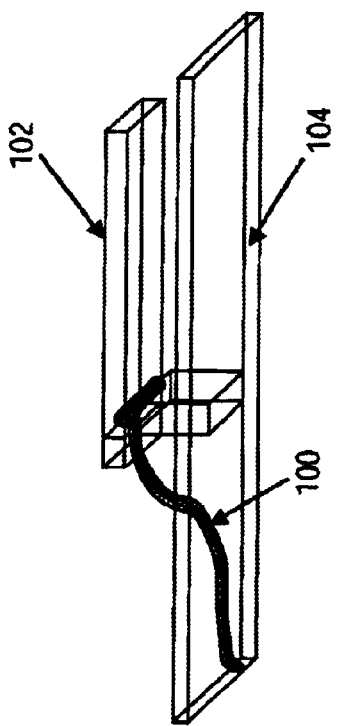
FIGS. 4a through 4c are partial perspective views of a bistable S-hinge.
Figure 4B:
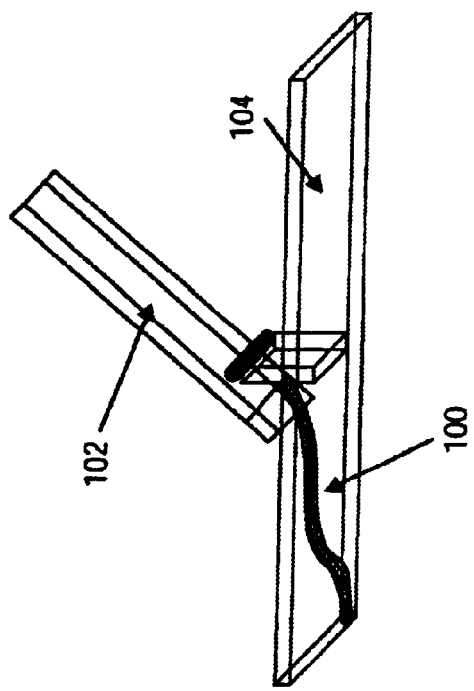
Figure 4C:
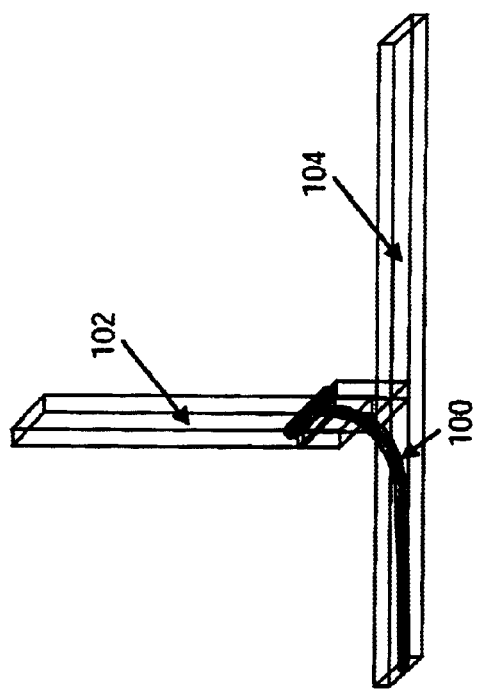

As shown in FIGS. 4a–4c, another approach to achieve a bistable response is to fabricate a compliant strap 100 between the micromirror 102 and the substrate 104 in such a manner that the strap has two relaxed states that correspond to the micromirror's first and second states, respectively, as shown in FIGS. 4a and 4c and a compressed state that first resists and then assists the actuation of the micromirror between its first and second states as shown in FIG. 4b. In its relaxed states, the strap exerts no force onto the mirror. As the mirror is actuated, the strap is compressed, which causes the strap to resist rotation and try to restore the mirror to its previous relaxed state. As the mirror continues to rotate due to the electrostatic actuation, the counter rotating force exerted by the strap increases until the strap passes through its maximum compression point. Further rotation of the mirrors starts to reduce the compression in the strap. At this point the force exerted by the strap assists the actuation forces causing the mirror, and the strap, to rotate to their other relaxed or stable state. This configuration can be implemented in combination with the bistable hinge structure discussed above to increase reliability should either fail. In this case, the display would be configured so that either force is sufficient to hold the mirror in its current state when the row is not enabled. When the row is enabled, the actuating force would exceed the sum of the two forces.

Bistable Latch Hinge

Figure 5A:
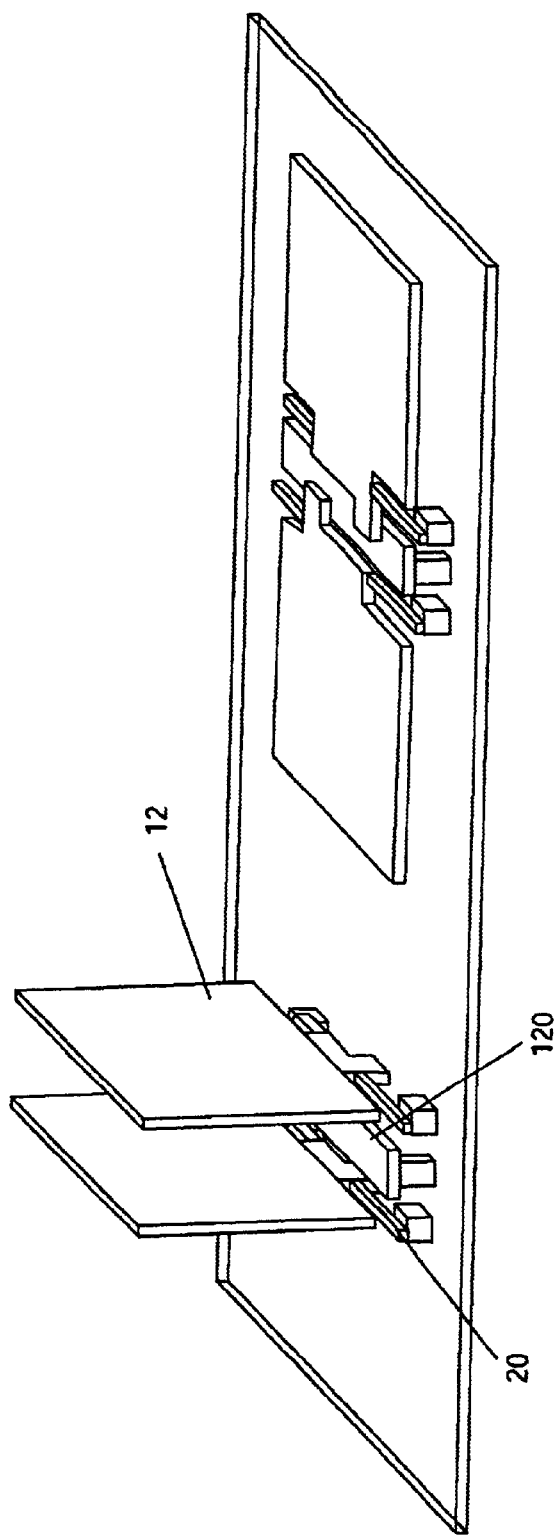
FIGS. 5a through 5c are perspective views of a bistable latch mechanism.
Figure 5B:
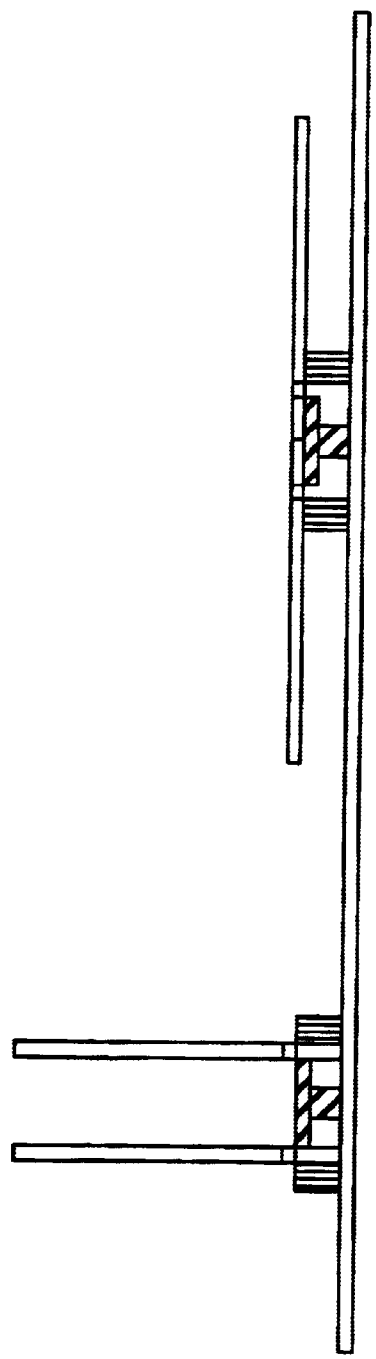
Figure 5C:
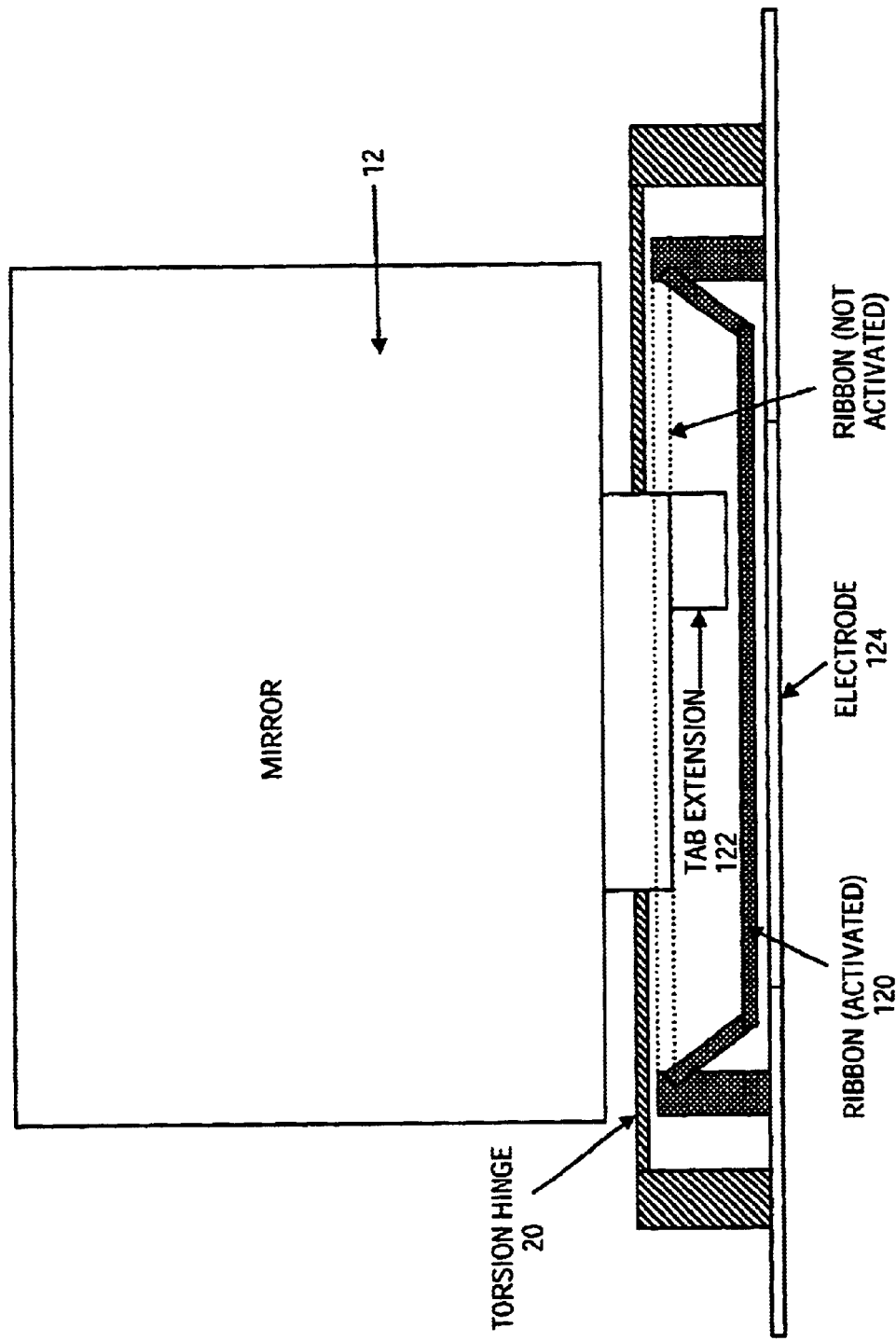

As shown in FIGS. 5a–5c, a bistable latch design is composed of a pair of mirrors 12 suspended by torsional hinges 20. In one embodiment, the mirrors are normally "down" (parallel to the substrate), and "actuated" by applying an electric field between the mirrors and an overhead electrode similar to the one shown in FIG. 6b. The elastic properties of the mirror hinge serve to return the mirror to its down position. The bistability feature is added by incorporating a ribbon 120 parallel to the substrate but located between the substrate and a tab extension 122 on the back side of the mirror. The ribbon is suspended above the substrate but has an underlying electrode 124 such that the ribbon can be pulled down to the substrate by applying an electric field.

The ribbon can be used to prevent rotation of the mirror both in the down (parallel to substrate position) and the up (perpendicular to the substrate) positions. When the mirror is down and the ribbon is in the rest(up) position, it supports the tab extension of the mirror and prevents the mirror from rotating upward. When the mirror is up and the ribbon is in the rest(up) position, it "catches" the tab extension of the mirror and prevents the mirror from rotating downward. When the ribbon is pulled down, the mirror is pulled to its down position by its own elastic properties.

Stiction Bumps

Figure 6A:
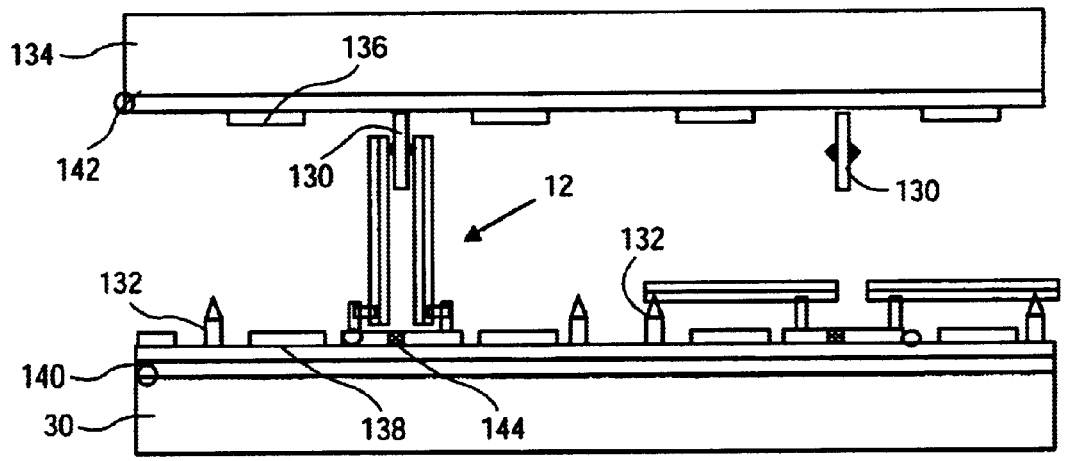
FIGS. 6a and 6b are perspective views of different bistable stiction mechanisms.
Figure 6B:
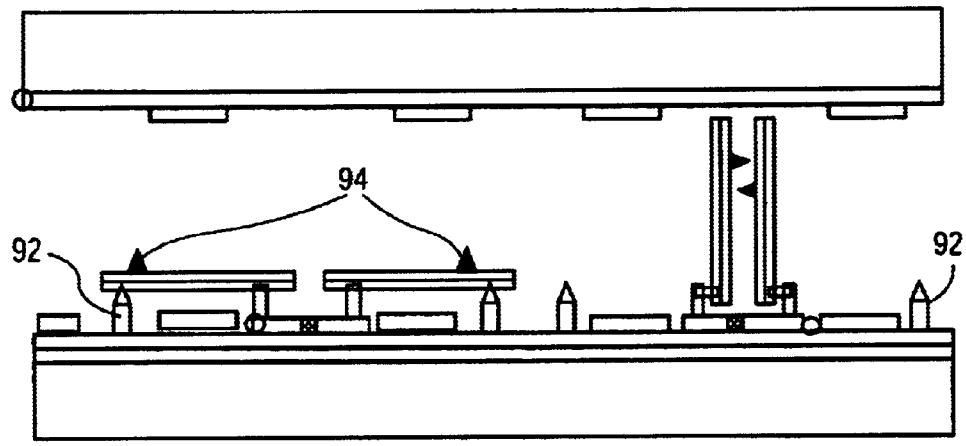

As shown in FIGS. 6a–6b, another approach to achieving a bistable response is to actuate a mirror 12 between a pair of stops 130 and 132 and use the Van der Walls forces, which occur when two materials come into contact, to create the bistability. Stops 130 and 132 can be placed either on the overlying substrate 134 as shown in FIG. 6a or fabricated on the top surfaces of the mirrors as shown in FIG. 6b.

By selecting materials and controlling the surface condition, a magnitude of adhesion force can be achieved which is low enough to allow the mirror to be driven to the opposite state when its row is enabled but large enough to exceed any force that might be applied to the mirror when its row is not enabled. As shown, stops 130 and 132 form a tip at the point of contact with mirror 12. The radius and/or area of the tip determines the magnitude of the adhesion force so that the mirror can be driven to the opposite state without having to use high voltage drive electronics. The application of a voltage between underlying electrodes 138 on substrate 30 and mirrors 12 creates an electric field, when the row of mirrors is enabled, that overcomes the stiction forces and pulls mirror 12 down. Similarly, the application of a voltage between overhead electrodes 136 and mirror 12 creates an electric field, when the row of mirrors is enabled, that overcomes the stiction force and pulls mirror 12 up. Underlying electrodes 138 and overhead electrodes 136 are connected in rows, by row addressing lines 140 and 142 respectively, while mirrors 12 are connected in columns, by column addressing lines 144. The mirrors are enabled a row at a time and driven to their desired state.

This configuration can be implemented in combination with the bistable hinge structure discussed above to increase reliability should either fail. In this case, the display would be configured so that either force is sufficient to hold the mirror in its current state when the row is not enabled. When the row is enabled, the actuating force would exceed the sum of the two forces. Alternately, a very weak or even a freely rotating hinge structure can be used in conjunction with the Van der Waals forces. The latter type of structure can be built using standard MEMS processing techniques such that the mirror is formed with a pair of pins that are positioned inside a pair of yokes.

In some cases, the mirrors may "stall" before they reach full deflection. In the paired mirror configuration this can be overcome by connecting a resistor between the mirrors. This establishes a voltage difference between the mirrors and enough force once they are reasonable close together to obtain full deflection.

Bistable Stretch Hinge

Figure 7C:
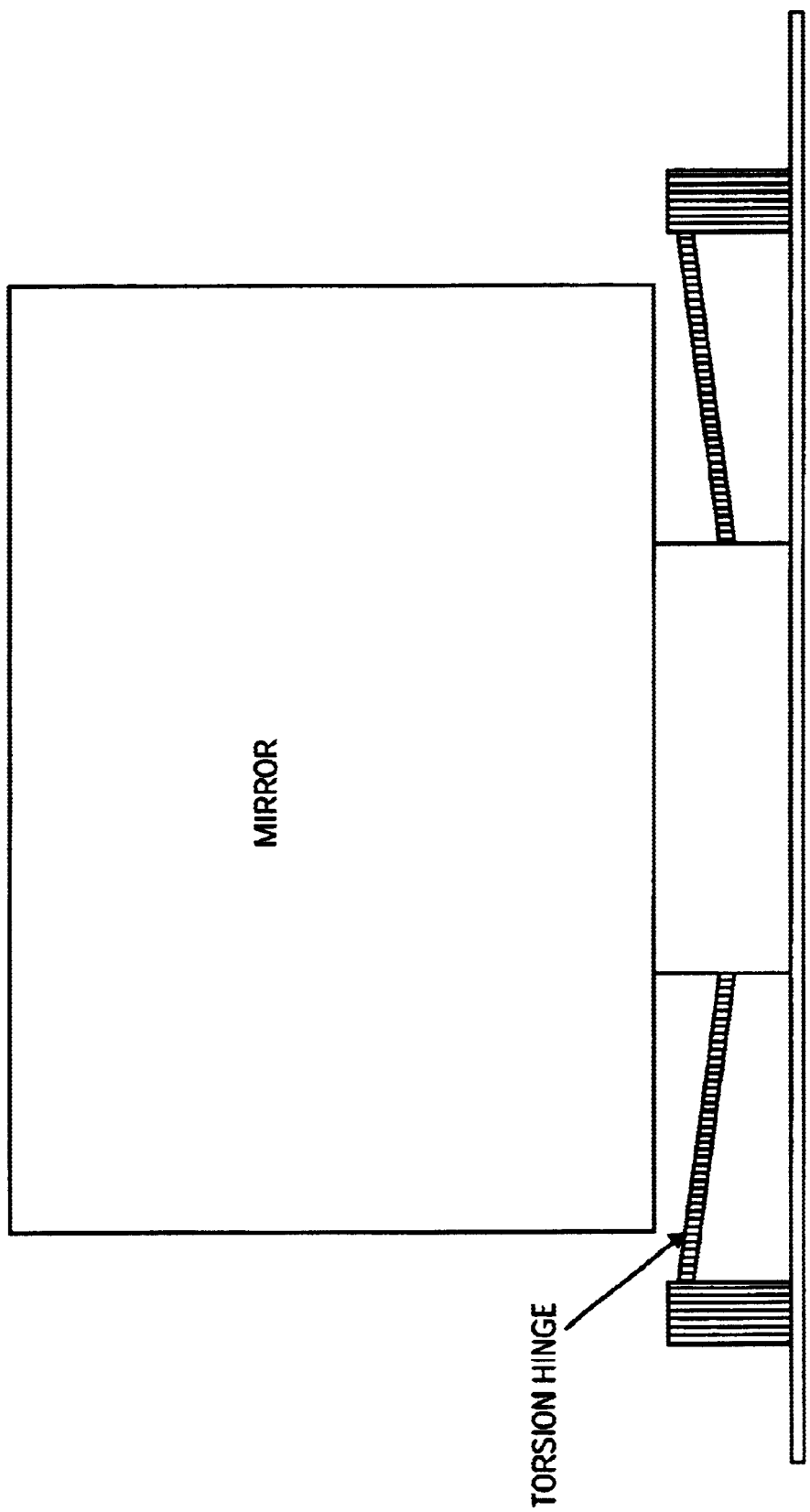

As shown in FIGS. 7a–7c, a bistable stretch design with a pair of mirrors 12 suspended by torsional hinges 20. In one embodiment, the mirrors are normally "down" (parallel to the substrate), and "actuated" by applying an electric field between the mirrors and an overhead electrode (not shown). The bistability feature is added by fabricating hinge 20 as an elastic hinge which stretches upward when the attracting voltage is applied to it from an overhead electrode. When the attracting voltage is suddenly removed, the elasticity of the hinge causes a mirror tab 150 to move down to substrate 30 where it sticks to the substrate holding the mirror in an upright position. This movement downward of the mirror tab is faster than the hinge restoring torque and the result is that the mirror sticks in an upright position rather than rotating down to its original position parallel to the substrate. If the attracting voltage on the overhead electrode were reduced in voltage slowly then the mirror would rotate back down to its original position parallel to the substrate.

Monolithic Bistable Direct-View Display

Figure 8:
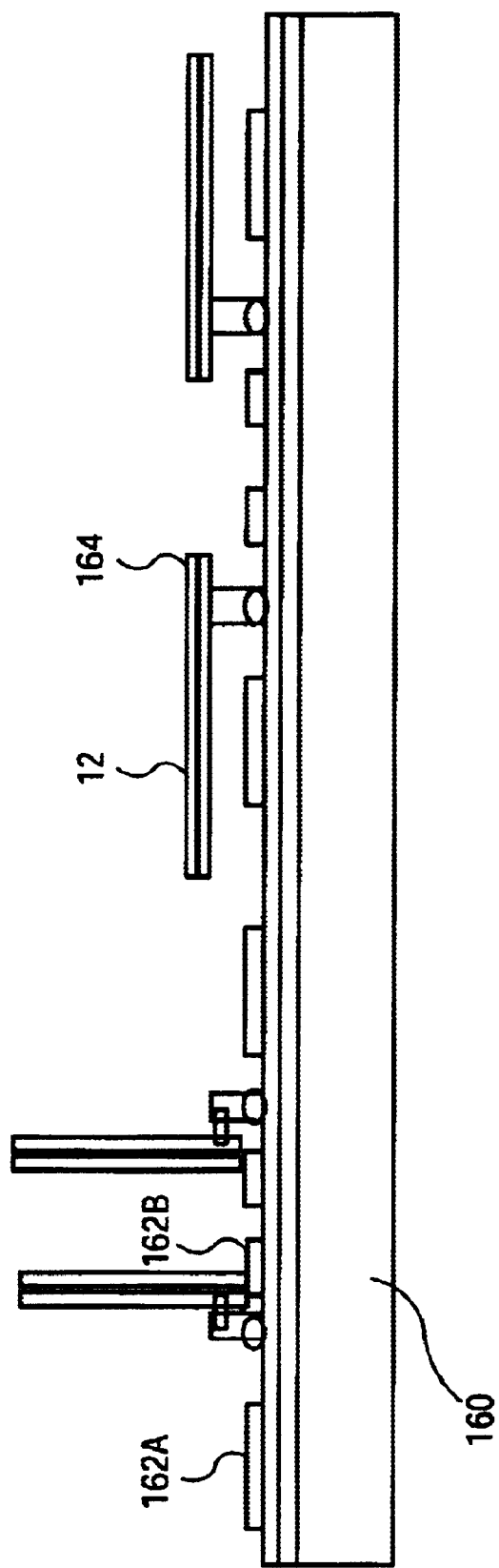
FIG. 8 is a sectional view of a monolithic bistable direct-view display using a split lower electrode.

As shown in FIG. 8, the direct-view display can be fabricated on a single monolithic substrate 160 by splitting underlying electrodes 138 into electrodes 162a and 162b on opposite sides of hinge 20 and extending mirror 12 to form a mirror tab 164 that extends over electrode 162b. The mirrors are normally "down" (parallel to the substrate), and "actuated" by applying an electric field between the mirrors and split electrode 162b, which pulls mirror tab 164 down thereby raising the mirror. Bistability is achieved by bringing mirror tab 164 into contact with electrode 162b. The application of a voltage between the mirrors and electrode 162a produces an attractive force that overcomes the stiction force and returns the mirror to its normal down position. Underlying electrodes 162a and 162b are connected in rows, by row addressing lines 166a and 166b, respectively, while mirrors 12 are connected in columns, by column addressing lines 168. The mirrors are enabled a row at a time and driven to their desired state.

Quasi Bistable Display

As discussed previously, quasi bistable devices also switch between two stable states. One state is stable due to the mechanics of the device, e.g. hinge, but the other state is stable due to an applied holding voltage. Removal of the holding voltage allows the mirror to switch to the other state. Often a combination of a holding voltage and stiction is used to hold the mirror, either force alone being insufficient to overcome the spring force of the hinge. For example, in a multiplexed addressing scheme the holding voltage is typically much less than the actuation voltage in order to avoid false actuation when the row is not enabled. As such an addition force, e.g. stiction, is required to hold the mirror in the stable state.

The bistable displays illustrated in FIGS. 6a and 6b are easily modified to define a quasi bistable display. First, the underlying electrodes 138 and stiction bumps 132 are eliminated. Second, the stiction bumps 130 are modified such that the stiction force is reduced so that on its own the stiction force is not sufficient to overcome the spring force of hinge 20. Third the addressing scheme is modified to apply a holding voltage between electrode 136 and the mirror when the row is not enabled. The holding voltage may bounce around as the same column in different rows is addressed but will always exceed a minimum threshold. The combination of the holding voltage and the stiction force holds the mirror in its upright position. The mirror is switched to its rest state by releasing the hold voltage such that the spring force overcomes the stiction force.

A monolithic quasi bistable direct-view display 170 can be implemented using stress curled mirrors 172 as shown in FIGS. 9a–9c. Curvature is produced by sandwiching together two materials with different residual stresses. The lower material has residual compressive stress and the upper material has residual tensile stress. When released, the mirror curls upward away from the substrate 174. The stress levels are controlled so that when released the mirror curls to approximately ninety degrees. The application of a voltage between mirrors 172 and a pair of underlying electrodes 176, which are separated from the mirrors by a dielectric layer 178 to avoid metal-to-metal contact flattens the curved section of the mirror down against the substrate. Once flattened against the substrate, a holding voltage is applied. The electrostatic force plus the fiction force between the mirror and the dielectric layer exceed the intrinsic stress of the mirror. When the holding voltage is removed, intrinsic stress in the mirror returns the mirror to its upright position.

A passive addressing scheme may be used to actuate the mirrors. Row and column addressing lines 180 and 182 respectively connect the mirrors 172 and control electrodes 176. Voltages are applied to the row addressing lines that enable the mirrors one row at a time while disabling the remaining rows. Addressing voltages are applied to the column addressing lines to actuate the mirrors in the enabled rows to their desired states. Note, a face glass with a second set of row addressing lines is not required.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A direct view display, comprising:

a background;

an array of micromirrors, each micromirror has a top surface that absorbs light and a bottom surface that reflects light; and an array of hinges that are adapted to rotate and switch the respective micromirrors between two states, a first state in which the micromirror covers a portion of the background thereby exposing the micromirror's top surface and a second state in which the micromirror substantially uncovers and exposes the portion of the background, wherein said background reflects ambient light, said micromirrors being configured in pairs that switch together so that, in said first state, their top surfaces absorb ambient light and, in said second state, their top surfaces face each other to reduce the absorption of ambient light and their bottom surfaces are exposed to reflect ambient light to and from the background.

2. The display of claim 1, wherein the micromirrors are electrostatically actuated.

3. The display of claim 2, further comprising a controller that applies a potential to produce electrostatic forces for actuating the micromirrors between their two states.

4. The display of claim 3, wherein the controller applies a first potential to enable selected micromirrors for a period longer than a response time of the micromirrors, and then applies a second potential to actuate the enabled micromirrors between their first and second states, the remaining non-enabled micromirrors remaining in their current state.

5. The display of claim 1, further comprising a stability mechanism that causes said micromirrors to remain in either of the first and second states unless and until an actuating force is applied to the micromirrors that is sufficient to overcome an actuation threshold.

6. The display of claim 5, wherein said array of hinges comprises an array of bistable torsional hinges that provide the stability mechanism, said bistable torsional hinges exhibiting a compressive stress when flat such that the hinge wants to rotate up or down between a pair of stable states to relieve the compressive stress, said torsional hinge rotating between its stable states to actuate the micromirrors between their two states.

7. The display of claim 5, wherein said array of hinges comprises an array of bistable S-hinges that provide the stability mechanism, said bistable S-hinges including a torsional hinge for rotating the micromirror and a compliant strap having two relaxed states corresponding to the mirror's first and second states and a compressed state that first resists and then assist the actuation of the micromirror between its first and second states.

8. The display of claim 5, wherein said array of hinges comprises an array of bistable latch hinges that provide the stability mechanism, said bistable latch hinges including a torsional hinge for rotating the mirror, which has a tab extension that extends beyond said torsional hinge, and a latch mechanism that supports the tab extension in the micromirror's first stable state thereby preventing it from rotating upward and catches the tab extension in the micromirror's second state thereby preventing it from rotating downward.

9. The display of claim 8, wherein said latch mechanism comprises a compliant ribbon and an electrode that actuates the ribbon up and down to catch and release the tab extension.

10. The display of claim 5, wherein said array of hinges comprises an array of bistable stretch hinges that provide the stability mechanism, said bistable stretch hinges having an elastic property such that when the micromirror is rotated to its second state the hinge is stretched causing said hinge to snap back and contact the background where is stays due to stiction forces.

11. The display of claim 5, wherein the stability mechanism comprises first and second stops associated with each of the micromirrors, the first and second stops positioned so that their respective micromirror contacts the first and second stops when the respective micromirror is in the first and second states, respectively, wherein the micromirrors and their respective first and second stops are adapted so that stiction forces are created when the micromirrors contact their respective first or second stops that hold the micromirrors in either state when power is removed from the array of micromirrors.

12. The display of claim 5, wherein each said micromirror has a tab extension that extends beyond said hinge, said stability mechanism comprising a pair of electrodes underneath said micromirror and tab extension on either side of the hinge that actuate the micromirror between its first and second states, bistability being achieved by bringing the tap extension into contact with its underlying electrode.

13. The display of claim 5, wherein said micromirrors have a residual stress that causes them to curl upward into their second states, further comprising an array of electrodes on the background that are separated from the mirrors by a dielectric layer, said electrodes being configured to first receive an actuation voltage that rotates the micromirrors downward and flattens them against the dielectric layer and then receive a holding voltage, which together with the stiction force between the micromirror and dielectric, holds the micromirrors in their first state.

14. A direct-view display, comprising:

a background;

an array of micromirrors, each micromirror has a top surface that absorbs light and a bottom surface that reflects light;

an array of hinges that are adapted to rotate and switch the respective micromirrors between two stable states, a first state in which the micromirror covers a portion of the background thereby exposing the micromirror's top surface and a second state in which the micromirror substantially uncovers and exposes the portion of the background, wherein said background reflects ambient light, said micromirrors being configured in pairs that switch together so that, in said first state, their top surfaces absorb ambient light and, in said second state, their top surfaces face each other to reduce the absorption of ambient light and their bottom surfaces are exposed to reflect ambient light to and from the background; and a stability mechanism that causes said micromirrors to remain in either stable state unless and until the actuating force applied to the micromirrors is sufficient to overcome an actuation threshold.

15. The display of claim 14, wherein said array of hinges comprises an array of bistable torsional hinges that provide the stability mechanism, said bistable torsional hinges exhibiting a compressive stress when flat such that the hinge wants to rotate up or down between a pair of stable states to relieve the compressive stress, said torsional hinge rotating between its stable states to actuate the micromirrors between their two states.

16. The display of claim 14, wherein said array of hinges comprises an array of bistable S-hinges that provide the stability mechanism, said bistable S-hinges including a torsional hinge for rotating the micromirror and a compliant strap having two relaxed states corresponding the mirror's first and second states and a compressed state that first resists and then assists the actuation of the micromirror between its first and second states.

17. The display of claim 14, wherein said array of hinges comprises an array of bistable latch hinges that provide the stability mechanism, said bistable latch hinges including a torsional hinge for rotating the mirror, which has a tab extension that extends beyond said torsional hinge, and a latch mechanism that supports the tab extension in the micromirror's first stable state thereby preventing it from rotating upward and catches the tab extension in the micromirror's second state thereby preventing it from rotating downward.

18. The display of claim 17, wherein said latch mechanism comprises a compliant ribbon and electrode that actuates the ribbon up and down to catch and release the tab extension.

19. The display of claim 14, wherein said array of hinges comprises an array of bistable stretch hinges that provide the stability mechanism, said bistable stretch hinges having an elastic property such that when the micromirror is rotated to its second state the hinge is stretched causing said hinge to snap back and contact the background where is stays due to stiction forces.

20. The display of claim 14, wherein the stability mechanism comprises first and second stops associated with each of the micromirrors, the first and second stops positioned so that their respective micromirror contacts the first and second stops when the respective micromirror is in the first and second states, respectively, wherein the micromirrors and their respective first and second stops are adapted so that stiction forces are created when the micromirrors contact their respective first or second stops that hold the micromirrors in either state when power is removed from the array of micromirrors.

21. The display of claim 14, wherein each said micromirror has a tab extension that extends beyond said hinge, said stability mechanism comprising a pair of electrodes underneath said micromirror and tab extension on either side of the hinge that actuate the micromirror between its first and second states, bistability being achieved by bringing the tap extension into contact with its underlying electrode.

22. The display of claim 14, wherein said micromirrors have a residual stress that causes them to curl upward into their second states, further comprising an array of electrodes on the background that are separated from the mirrors by a dielectric layer, said electrodes being configured to first receive an actuation voltage that rotates the micromirrors downward and flattens them against the dielectric layer and then receive a holding voltage, which together with the stiction force between the micromirror and dielectric, holds the micromirrors in their first state.

23. A bistable direct-view display, comprising:

a background;

an array of micromirrors, each micromirror has a top surface that absorbs light and a bottom surface that reflects light;

an array of hinges that are adapted to rotate and switch the respective micromirrors between two stable states, a first state in which the micromirror covers a portion of the background thereby exposing the micromirror's top surface and a second state in which the micromirror substantially uncovers and exposes the portion of the background, wherein said background reflects ambient light, said micromirrors being configured in pairs that switch together so that, in said first state, their top surfaces absorb ambient light and, in said second state, their top surfaces face each other to reduce the absorption of ambient light and their bottom surfaces are exposed to reflect ambient light to and from the background;

a bistable mechanism that causes said micromirrors to remain in either stable state unless and until an actuating force is applied to the micromirrors that is sufficient to overcome an actuation threshold; and a controller that applies a first potential to the micromirrors a row at a time to enable that row and applies a second potential to each column of micromirrors to produce an actuating force on the micromirrors in the enabled row that exceeds the actuation threshold and actuate the enabled mirrors between their two stable states, the actuating forces on the micromirrors in the remaining non-enabled rows being insufficient to overcome the actuation threshold so that the non-enabled mirrors remain in their current stable state.

* * * * *

UNITED STATES PATENT AND TRADEMARK OFFICE
CERTIFICATE OF CORRECTION

PATENT NO. : 6,639,572 B1
DATED : October 28, 2003
INVENTOR(S) : Little et al.

It is certified that error appears in the above-identified patent and that said Letters Patent is hereby corrected as shown below:

Title page,
Item [75], Inventors, delete "Michael L. Little", insert -- Michael J. Little --.

Signed and Sealed this

Eleventh Day of May, 2004

JON W. DUDAS
*Acting Director of the United States Patent and Trademark Office*